Oct. 5, 1954  H. FREEDMAN  2,690,618
AMALGAM CARRIER
Filed June 26, 1951  3 Sheets-Sheet 1
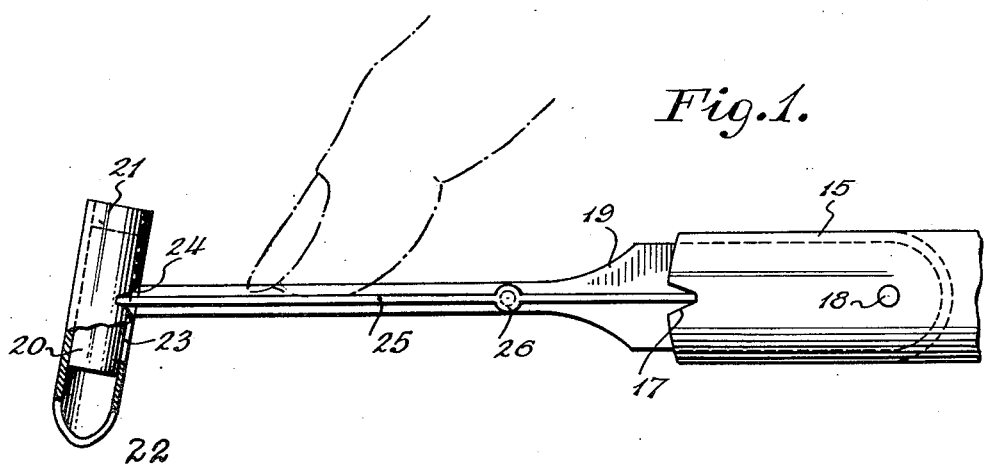
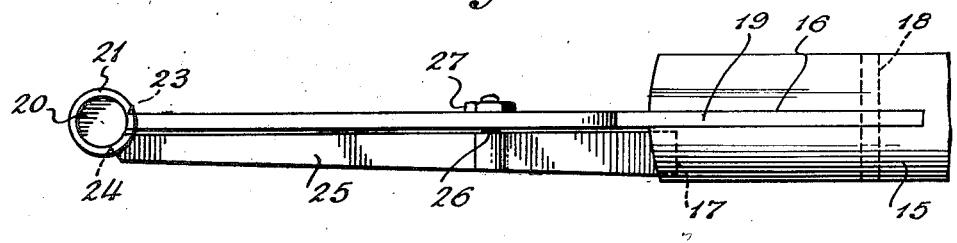
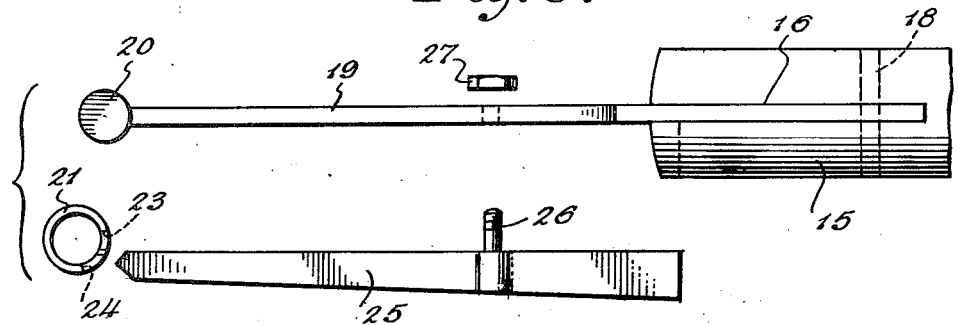
INVENTOR
HYMAN FREEDMAN
BY
ATTORNEY

INVENTOR
HYMAN FREEDMAN
BY
ATTORNEY

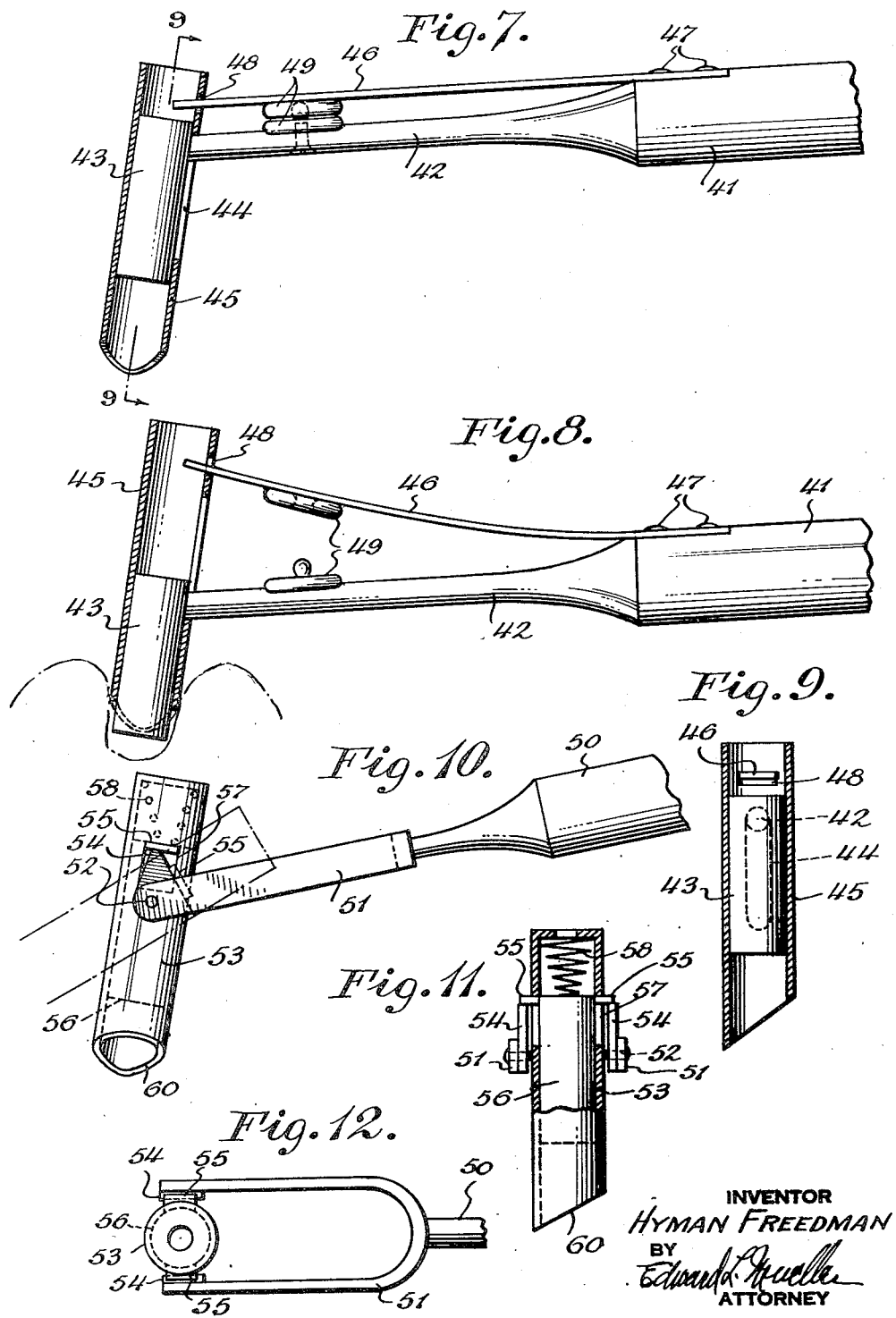

Patented Oct. 5, 1954

2,690,618

UNITED STATES PATENT OFFICE 2,690,618

AMALGAM CARRIER

Hyman Freedman, New York, N. Y.

Application June 26, 1951, Serial No. 233,649

7 Claims. (Cl. 32—60)

This invention relates to improvements in dental instruments and has particular reference to an instrument utilized in the filling of teeth.

An object of the invention is to provide an improved instrument of simple and practical design by means of which the formation of a pellet of filling material, and the deposit and tamping thereof into a cavity is accomplished with greater facility than heretofore attained.

The inventive idea involved is capable of receiving a variety of mechanical expressions some of which, for purposes of illustration, are shown in the accompanying drawings wherein:

Fig. 1 is a fragmentary side elevation, partly in section, of one form of the invention, with the parts in position for gathering up a pellet of filling material from a suitable receptacle preparatory to discharging the pellet into a cavity;

Fig. 2 is a top plan view thereof;

Fig. 3 is an exploded view showing the manner in which the parts of the instrument may be taken apart;

Fig. 7 is a side elevation, partly in section, of another form of the invention;

Fig. 8 is a view similar to Fig. 7, showing the parts in pellet discharging position;

Fig. 9 is a section on the line 9—9 of Fig. 7;

Fig. 10 is a side elevation of still another form of the invention, the dotted lines indicating the pellet discharge position;

Fig. 11 is a vertical longitudinal section through the sleeve-like member and tamping head of the instrument shown in Fig. 10;

Fig. 12 is a fragmentary top plan view;

Figure 13:
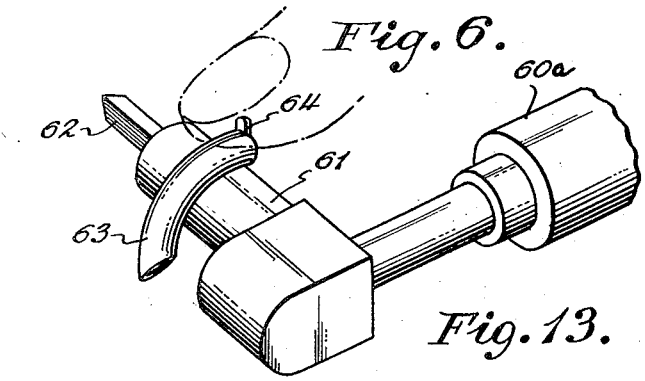
Figure 14:
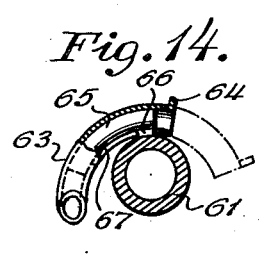

Fig. 13 is a fragmentary perspective view of a dental hand tool showing still another modification of the invention applied thereto; and Fig. 14 is a transverse sectional view through a portion of the hand tool showing, partly in section, the instrument of the invention mounted thereon, the dotted lines indicating the withdrawn position of the sleeve member in which a pellet is ejected from the instrument.

Referring to Figs. 1 to 3, the instrument herein shown comprises a handle 15 having a longitudinal slot 16 at one end thereof and further having, in one of the end portions forming said slot, a V-shaped notch 17 opening laterally in the outer side face of said end portion.

Pivoted at 18 to the handle 15 at the inner end of said slot 16 a distance from the extremity of said handle, is one end of a long arm 19 widened in said end portion of the handle and tapering outwardly toward its other end where it is attached to a rod-like tamping head 20. This head extends longitudinally within a sleeve-like member 21 one end 22 of which is cut obliquely to provide a sloping configuration which facilitates the discharge of a pellet from the cavity within said member, which cavity is formed by the adjacent end of the head 20 when the latter is in its retracted position within said member, as shown in Fig. 1.

The member 21 is longitudinally slotted at 23 to receive the outer end of the arm 19 to which the head 20 is attached and said slot thus permits of movement of the member relative to the head when discharging a pellet from the end 22 of said member and, at the same time, moving the adjacent end of the head to an extended position beyond said end 22 so that said head can be employed to tamp the filling material which has been discharged into a tooth cavity. Said member 21, in order to be supported in cooperative relation to the head 20, is also provided, at a point spaced slightly in a circumferential direction from the slot 23, with a transverse slot 24 adapted to freely receive the inserted outer end of a short supporting arm 25, the inner end of which is seated in the lateral notch 17 of the handle 15 to thus provide for limited pivotal movement of said arm relative to said handle. The arms 19 and 25 are detachably connected intermediate their ends by means of a screw threaded stud 26 extending laterally from the arm 25 and through the arm 19 and receiving a tightening nut 27 thereon. By this construction it will be obvious, as shown in Fig. 3, that the arm 25 may be detached from the arm 19 and the sleeve 21, and the latter then withdrawn from the head 20 for cleansing purposes after which the parts may be readily re-assembled.

With the pivotal points of the two arms of different lengths thus spaced from each other there is provided, in effect, a compound leverage which will produce a relative movement between the head 20 and member 21 when the end 22 of said member is rested against the wall of a tooth cavity and pressure is exerted upon the handle 15. This relative movement will cause the effective end of the head 20 to discharge a pellet from the cavity in the member 21 and into the tooth cavity and continued pressure will extend said end of the head 20 outwardly beyond the end 22 so that the head may be used to tamp the filling material in said tooth cavity. To refill the cavity in the end of the member 21 with filling material, the parts are restored to the position of Fig. 1 and finger pressure is applied to the arm 19, as indicated, to maintain the tamping head and sleeve member in fixed relation while the filling material is gathered into said cavity from a receptacle.

Figure 4:
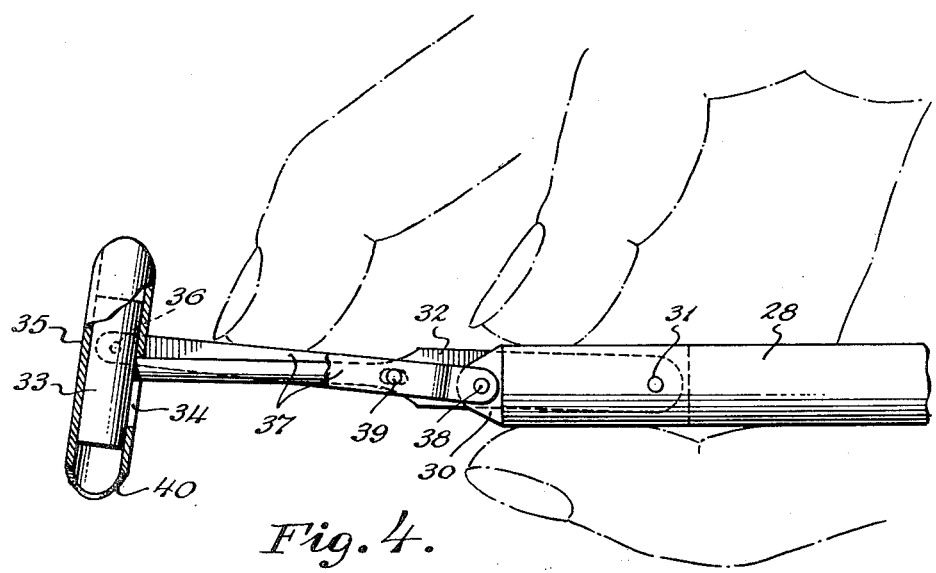
Fig. 4 is a view similar to Fig. 1, showing another form of the invention.
Figure 5:
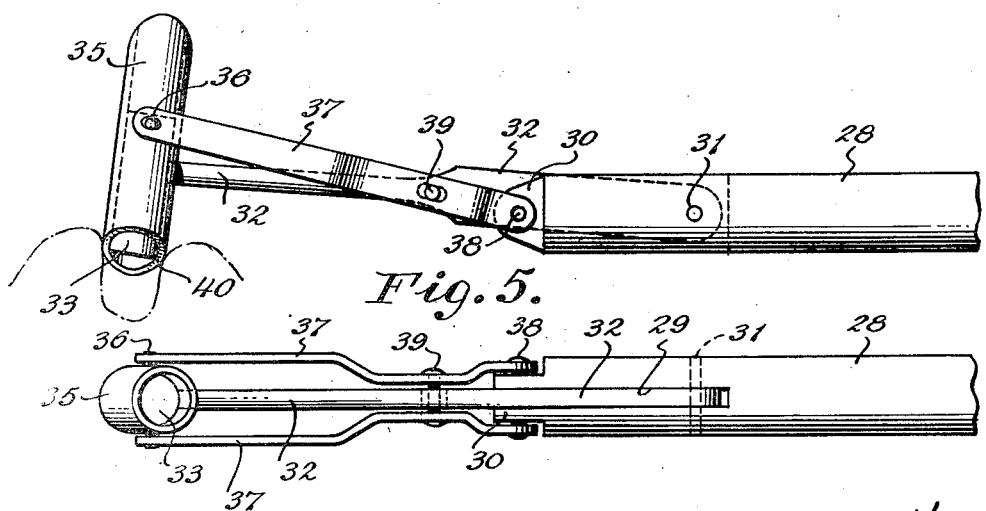
Fig. 5 is a view like Fig. 4, illustrating the position the parts assume when a pellet is being discharged into a tooth cavity.
Figure 6:
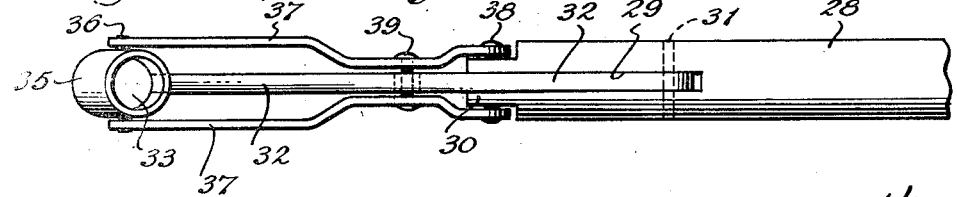
Fig. 6 is a top plan of the instrument shown in Figs. 4 and 5.

In the form shown in Figs. 4 to 6, the handle 28 is bifurcated at one end to provide a slot 29 and said end is formed with a reduced extension 30. At the inner end of the slot 29, there is pivoted, at 31, the inner end of a long arm 32 the outer end of which is attached to the tamping head 33 and extends through a longitudinal slot 34 formed in the sleeve-like member 35 in which the head 33 is located. Said member, at diametrically opposed points intermediate its length, has a pin and slot pivotal connection 36 to the outer ends of the complemental short arms 37 which are the equivalent of the arm 25 of Fig. 1 and between which the arm 32 extends. The inner ends of said arms 37 are pivoted at 38 to the extension 30 and adjacent said inner end the arms 37 have a pin and slot connection 39 with the arm 32 to permit of limited relative movement between said arms when they are moved about their respective pivots 38 and 31. As shown in Fig. 4, finger pressure upon the arms 37 maintains the parts in position to permit filling the cavity formed by the head 33 and sleeve 35. Then, to discharge said filling, the sloped end 40 of said sleeve is engaged with the wall of the tooth cavity and, with pressure then applied to the handle 28, the compound leverage causes the parts to assume the position of Fig. 5 in which the head 33 and sleeve 35 are relatively moved so that the filling material is discharged into the tooth cavity and the head 33 is extended slightly beyond the end 40 in which position said head may be used for tamping said material.

In Figs. 7 to 9, the handle 41 has rigidly formed as an extension thereof the arm 42 the outer end of which is secured to the tamping head 43 and extends through the longitudinal slot 44' in the sleeve 45. A longer arm 46 made of flat resilient material is secured at one end, as at 47, to the handle 41 with its outer end extending into a slot 48 in the sleeve 45 to support the same in position on the head 43. Cooperating elements 49 of a separable snap fastener are secured to the inner opposed surfaces of the arms 42 and 46 intermediate their ends for releasably retaining said arms in close relationship so that the head 43 is maintained retracted within the sleeve 45. Said arm 46 is spring biased so that when the fastener elements 49 are separated by pressure upon the handle 41 with the sleeve engaged with the tooth cavity wall, the arm 46 will move away from the arm 42 and thus move said sleeve relative to the tamping head, as in Fig. 8, to effect ejection of the filling material from said sleeve which had been gathered therein when the parts were in the position of Fig. 7.

In the form of instrument shown in Figs. 10 to 12, the handle 50 has extending from one end thereof a forked member 51 to the extremities of which is pivoted, at 52, the intermediate portion of the sleeve member 53 to enable said member to swing from the full to the dotted line position of Fig. 10. Fixed on the pivots 52 on opposite sides of the sleeve 53 are the cam members 54, and engaged with the high points of these cams, when the sleeve is in its full line position of Fig. 10, are the lugs 55 extending laterally from the inner end of the tamping head 56 and through the longitudinal slots 57 in the sleeve 53. When in the position referred to, the cams 54 maintain the tamping head 56 in its retracted position against the action of a coil spring 58 interposed between the closed end of the sleeve 53 and the inner end of the head 56. However, when the open, sloped end 60 of the sleeve is engaged with the wall of a tooth cavity and a pull is exerted upon the handle 50, said sleeve will be tilted. In so doing, the lugs 55 of the tamping head will disengage from the high points of the cams 54 to assume the dotted line position in Fig. 10 and thus enable the spring 56 to project said head outwardly and thereby discharge the filling material from the sleeve 53 where it had been gathered while the parts were in the full line position of Fig. 10. The slope of said cams 54 and the length of the slots 57 in the sleeve 53 will permit the outer end of the tamping head to project beyond the end 60 of the sleeve so that said head can be employed to pack the filling material in the tooth cavity.

Figs. 13 and 14 illustrate a modification in which the amalgam carrier is mounted upon a dentist's hand tool 60a of well known construction in which a lateral extension 61 provides a mounting for a drill 62 or other instrument. In the present form of the invention, a curved open ended sleeve member 63 having a finger piece 64 at one end is mounted for sliding movement on the arcuate tamping rod 65 fixed adjacent one end to the extension 61 by the lug 66, and for guiding this sliding movement the sleeve is provided with a longitudinal slot 67 through which said lug projects. The instrument extends transversely about the extension 61 and the curvature thereof and of the rod 65 with respect to that of said extension is such that the head of said rod and the end of the sleeve 63 remote from the finger piece 64 is spaced sufficiently from the extension to enable the hand tool to be easily manipulated, with a finger holding the sleeve as indicated in Fig. 13, to gather a pellet of filling material in said remote end of the sleeve. Then, to discharge said pellet from the instrument into a tooth cavity, it is only necessary to either engage the discharge end of the sleeve 63 with the bottom of said cavity and exert pressure upon the instrument, or utilize the finger piece 64 to slide the sleeve relative to the rod 65 to the dotted line position of Fig. 14, whereupon the pellet will be ejected from the sleeve by the head of said rod which can then be used for tamping. The discharge end of the sleeve being cut obliquely, as in the other forms of the invention, will facilitate the deposit of the pellet into the tooth cavity.

What is claimed is:

1. A dental instrument for use in filling teeth, comprising a handle, a sleeve-like member for receiving filling material in one end thereof and having said end cut obliquely to the axis of said member, a tamping head within said member and relative to which the latter is movable to effect discharge of said material therefrom through said obliquely cut end by said tamping head, and two arms, one connected to said sleeve-like member and the other to said tamping head and both joined to said handle and movable relatively to each other and to said handle.

2. A dental instrument for use in filling teeth, comprising a handle, a sleeve-like member, a tamping head within said member and with respect to which said member is relatively movable to locate said head in retracted and extended positions relative to said member, two relatively movable arms, one connected at one end to said tamping head and pivoted at its other end to said handle, and the other arm having one end engaged with said sleeve-like member and its other end joined to said handle for movement with respect thereto, and means connecting said arms intermediate their ends.

3. A dental instrument for use in filling teeth, comprising a handle, a sleeve-like member, a tamping head within said member and with respect to which said member is relatively movable to locate said head in retracted and extended positions relative to said member, two relatively movable arms, one connected at one end to said tamping head and pivoted at its other end to said handle, and the other arm detachably engageable at its opposite ends with said sleeve-like member and said handle, and means to detachably connect said arms intermediate their ends to permit of said other arm being disconnected from the first named arm and from said handle and sleeve-like member.

4. A dental instrument for use in filling teeth, comprising a handle, a sleeve-like member, a tamping head within said member and with respect to which said member is relatively movable to locate said head in retracted and extended positions relative to said member, and two relatively movable arms, one secured at one end to said tamping head and pivoted at its other end to said handle, and the other arm connected to said sleeve-like member and pivoted to said handle, there being a pin and slot connection between said arms intermediate their ends.

5. A dental instrument for use in filling teeth, comprising a handle, a sleeve-like member, a tamping head within said member and with respect to which said member is relatively movable to locate said head in retracted and extended positions relative to said member, two relatively movable arms of different lengths, the arm of greater length being connected at one end to said tamping head and pivoted at its other end to said handle at a point distant from one end of said handle, and the shorter arm being connected at one end to said sleeve-like member and pivoted to said end of the handle, and a pin and slot connection between said arms intermediate the ends thereof.

6. A dental instrument for use in filling teeth, comprising a handle, a sleeve-like member, a tamping head within said member and with respect to which said member is relatively movable to locate said head in retracted and extended positions relative to said member, two arms extending from said handle with one connected to said tamping head and the other to said sleeve-like member and the latter arm being spring biased to move said sleeve-like member relative to said tamping head so that the latter will assume its extended position, and cooperating fastening means between said arms for releasably securing the same together with said tamping head in its retracted position.

7. A dental instrument for use in filling teeth, comprising a handle, a sleeve-like member, a tamping head within said member and with respect to which said member is relatively movable to locate said head in retracted and extended positions relative to said member, two arms supported by said handle and movable relatively to each other with one of said arms connected to said head and the other to said sleeve-like member, and interengaging means at least temporarily connecting said two arms intermediate their ends whereby, upon engagement of the sleeve-like member with a tooth, said arms will move relatively to each other causing a discharge of amalgam into the tooth.

References Cited in the file of this patent

UNITED STATES PATENTS

| Number | Name | Date |
|---|---|---|
| Re. 11,502 | Richards | July 2, 1895 |
| 384,863 | Morris | June 19, 1888 |
| 608,934 | Hanson | Aug. 9, 1898 |
| 712,526 | Hammersmith | Nov. 4, 1902 |
| 1,469,004 | Holtz | Sept. 25, 1923 |
| 1,797,866 | Ivory | Mar. 24, 1931 |
| 2,537,454 | Freedman | Jan. 9, 1951 |